(12) United States Patent
Pothier et al.

(10) Patent No.: US 6,931,029 B1
(45) Date of Patent: Aug. 16, 2005

(54) SYSTEM AND METHOD FOR SYNCHRONIZING WITH DATA RECEIVED OVER AN UNRELIABLE ASYNCHRONOUS MEDIUM

(75) Inventors: Michael Pothier, Picton (CA); John Lynch, Belleville (CA); David Cairns, Belleville (CA); Glenn Eng, Belleville (CA); Andre Cyr, Belleville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/501,074

(22) Filed: Feb. 9, 2000

(51) Int. Cl.$^7$ .............................. H04J 3/06
(52) U.S. Cl. ...................... 370/503; 375/354
(58) Field of Search ................ 370/352–356, 370/428, 429, 466, 493, 412, 503, 514, 298; 375/354

(56) References Cited

U.S. PATENT DOCUMENTS

| | | | | |
|---|---|---|---|---|
| 4,586,189 A | * | 4/1986 | Tyrrell | 375/370 |
| 5,392,280 A | * | 2/1995 | Zheng | 370/353 |
| 5,666,362 A | * | 9/1997 | Chen et al. | 370/420 |
| 5,862,136 A | * | 1/1999 | Irwin | 370/395.4 |
| 6,047,002 A | * | 4/2000 | Hartmann et al. | 370/466 |
| 6,061,343 A | * | 5/2000 | son .ANG.kerberg | 370/345 |
| 6,178,138 B1 | * | 1/2001 | Derbenwick et al. | 365/233 |
| 6,181,694 B1 | * | 1/2001 | Pickett | 370/353 |
| 6,219,396 B1 | * | 4/2001 | Owada | 375/372 |
| 6,252,850 B1 | * | 6/2001 | Lauret | 370/235 |
| 6,487,198 B1 | * | 11/2002 | Pierson, Jr. | 370/356 |
| 6,526,059 B1 | * | 2/2003 | Yamazaki | 370/395.1 |

* cited by examiner

*Primary Examiner*—Ajit Patel
*Assistant Examiner*—Chirag Shah
(74) *Attorney, Agent, or Firm*—Mintz Levin Cohn Ferris Glovsky & Popeo P.C.

(57) ABSTRACT

A system for re-establishing synchrony with data that was synchronous data in a source device but for which synchrony is lost when the data is transmitted over an asynchronous and unreliable medium to a destination device. The system includes buffering of the data received in the destination device from the asynchronous network, readout of the buffers according to a clock, and adjusting the rate of the clock in the destination device according to the rate of transmitting the data from the source device. The clock rate is thus adjusted to re-establish synchrony, and the clock may be used to control synchronous handling of the received data within the destination device.

35 Claims, 9 Drawing Sheets

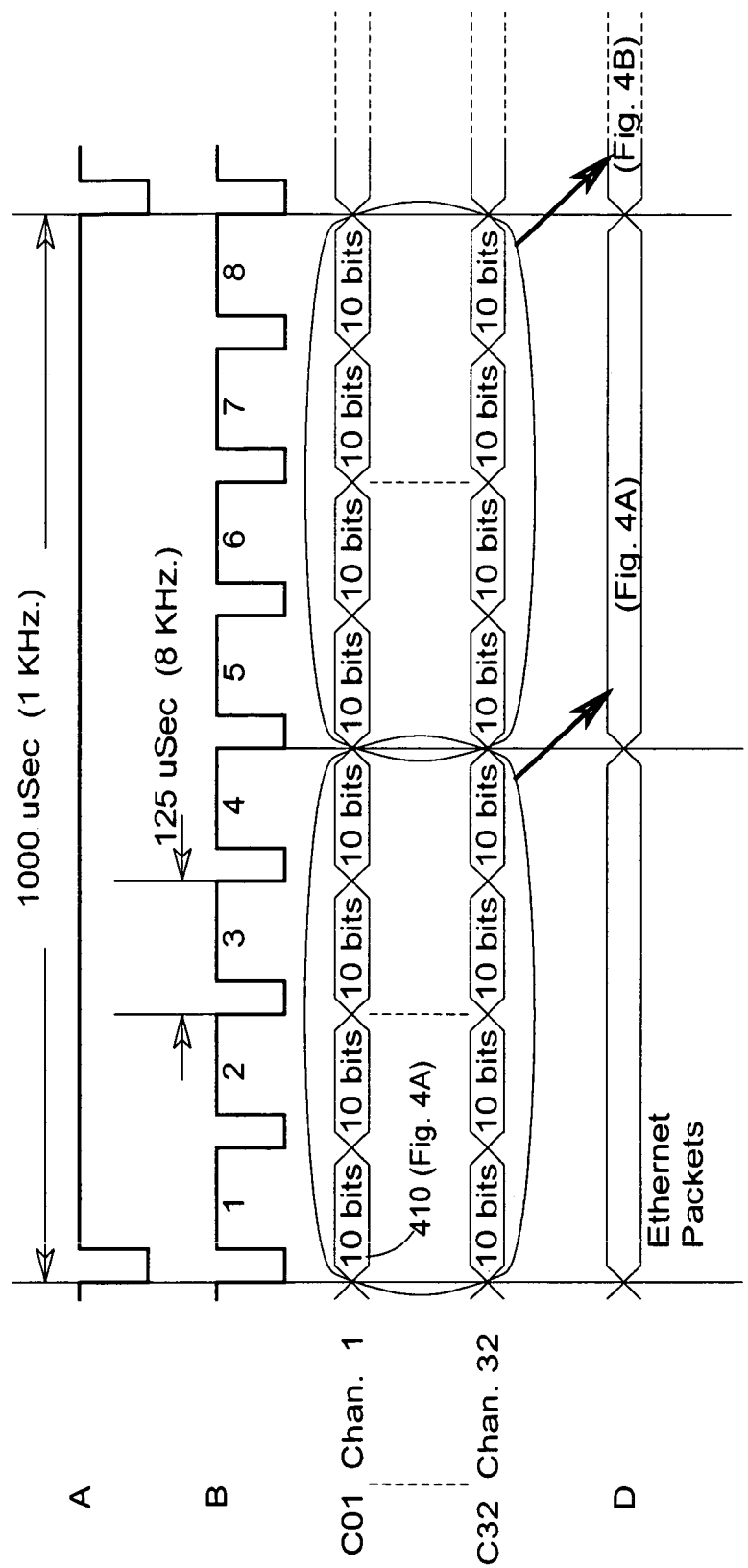

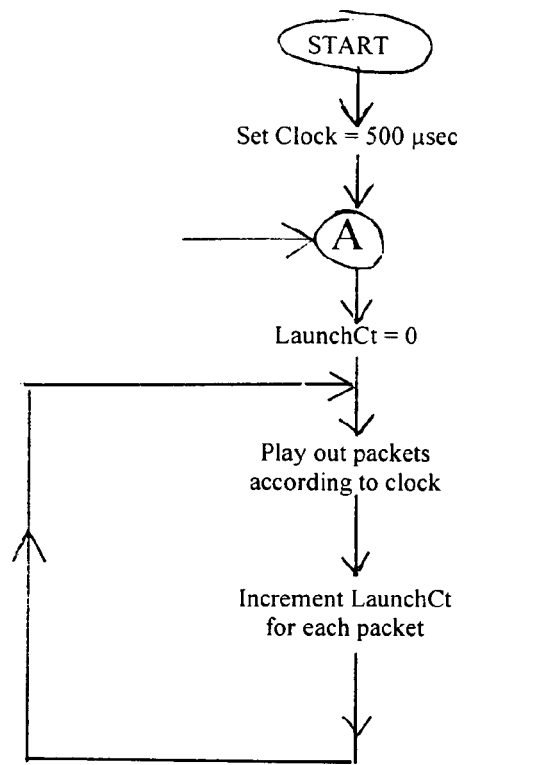
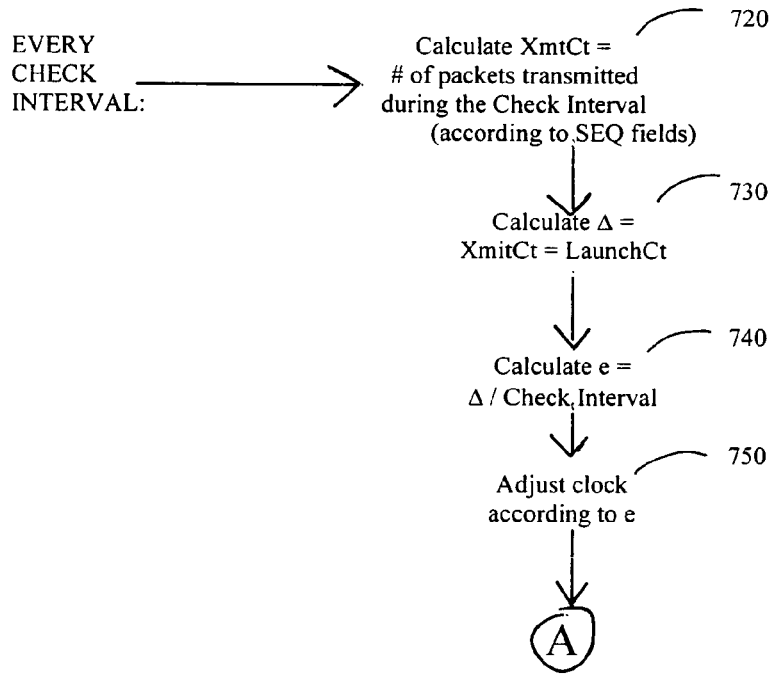
Fig. 7

SYSTEM AND METHOD FOR SYNCHRONIZING WITH DATA RECEIVED OVER AN UNRELIABLE ASYNCHRONOUS MEDIUM

FIELD OF THE INVENTION

This invention relates generally to the transmission of synchronous data by means of an unreliable asynchronous connection, and more particularly to re-establishing synchronization with the data after reception from the asynchronous connection.

BACKGROUND OF THE INVENTION

At a location such as the offices of a business, there typically are many telephones that may be used to communicate among themselves as well as over the public switched telephone network (PSTN) with other telephones at other locations. In such an application, it is typical practice to provide a PBX at the office location for facilitating the connections among the telephones at the office location.

A basic PBX installation consists of a cabinet to which a number of phones may be connected, and which contains the circuitry for interconnecting those phones. The number of phones that may be serviced by one cabinet is limited by the amount of circuitry that may be accommodated within the cabinet. A typical number of phones serviced by one PBX cabinet is on the order of 50 to 100.

If it is desired to service a number of phones greater than that which may be serviced by one PBX cabinet, the PBX may be augmented by additional PBX cabinets connected to the original one. FIG. 1 depicts two PBX cabinets 101, each servicing a number of phones. The two PBX cabinets 101 are connected by a wire path 102, through which a phone connected to one of the PBX cabinets may communicate with a phone connected to another of the PBX cabinets path 102 may be other forms of hard path other than a wire path, such as a fiber optic path. All the cabinets comprising a single PBX are in the same general location, typically no more than several hundred feet apart. By using repeaters, the distance between cabinets can be extended to several miles.

As the distance between PBX cabinets increases, (e.g., when interconnecting phones in different buildings on an office campus) it may be convenient to interconnect the PBX cabinets by means other than a copper or fiber optic path. For example, it may be convenient to interconnect PBX cabinets by an Internet Protocol (IP) connection. An IP network may already be in existence. However, when interconnecting PBX cabinets it is necessary to transmit not only data but also a timing reference. Copper path 102 (FIG. 1) carries a timing reference. However, an IP connection (e.g., an Ethernet connection) transmits data asynchronously, i.e., without a timing reference. Also, an IP network routes each packet according to current network conditions, and thus as conditions change packets may take different routes and may be held up for varying amounts of time. When an IP network is lightly loaded and functioning under optimal conditions, it probably delivers output at substantially the same rate as its input, but under adverse conditions, such as heavy load, packets may be delayed by markedly different amounts of time, and may even be lost entirely. Packets may thus arrive at the destination at a different instantaneous rate and in a different order than that in which they were transmitted, may arrive too late to be acted upon, or may not arrive at all.

There is thus a need to reconstruct a timing reference for synchronous data after transmission thereof by an asynchronous, unreliable communication medium which may deliver data out of order, which may deliver data at an instantaneous rate substantially different than its transmission rate, and which may lose portions of the data.

It is an advantage of the present invention that a system and method is provided for reconstructing a timing reference for synchronous data that has been transmitted by an asynchronous communication medium.

It is a further advantage of the present invention that a system and method is provided for reconstructing such a timing reference for synchronous data that has been transmitted out of order and with data loss by an unreliable asynchronous communication medium.

These and other advantages of the invention will become apparent to those skilled in the art from the following description thereof.

SUMMARY OF THE INVENTION

In accordance with the teachings of the present invention, these and other advantages may be accomplished by the present systems and methods of reestablishing synchrony with formerly synchronous data that has been transmitted over an asynchronous network.

An embodiment of the present invention includes synchronizing a clock with data received via an asynchronous transmission medium by holding in buffers blocks of data received from the transmission medium, reading out the data from the buffers at a rate specified by the clock, and regulating the rate specified by the clock according to occurrence of data in the buffers.

An aspect of the present invention includes regulating the rate specified by the clock so that the data is read out from the buffers at a rate substantially equal to a rate at which the data is currently arriving via the asynchronous transmission medium.

Another aspect of the invention includes initially setting the rate specified by the clock to a predetermined constant rate at which data is being input to the asynchronous transmission medium.

Another aspect of the invention includes regulating the clock rate so the point of reading out from the buffers stays a predetermined distance from the point of storing into the buffers.

Another aspect of the invention includes transmitting the data as packets, determining whether a packet has been lost in transmission, and reconstituting the packet at the destination with arbitrary data so that timing relationships among the other packets are not affected.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which:

FIG. 3 is a timing diagram for assembling synchronous PBX data into Ethernet/IP packets according to the present invention;

FIG. 7 is a flow chart of an alternative method for reconstructing a synchronous clock after asynchronous transmission according to the present invention;

DESCRIPTION OF THE INVENTION

Figure 1:
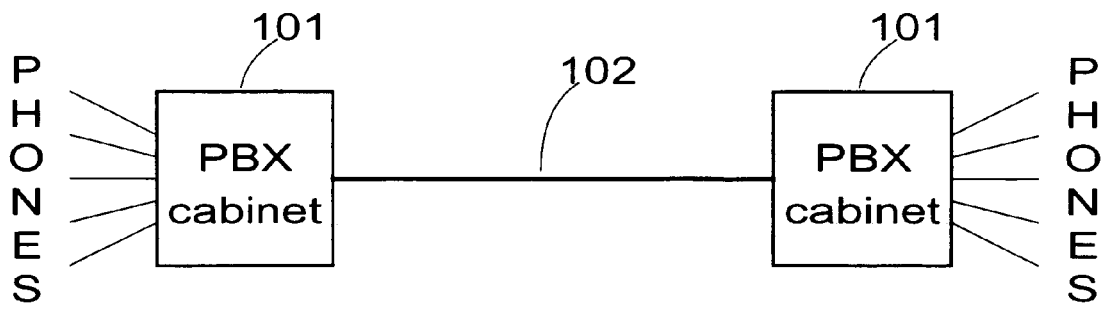
FIG. 1 (prior art) depicts two PBX cabinets, each servicing a number of phones, interconnected by a copper path.
Figure 2:
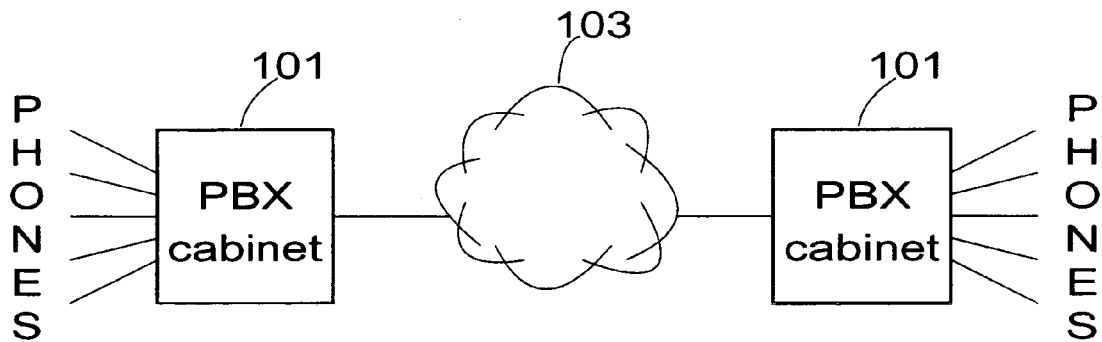
FIG. 2 depicts two PBX cabinets, each servicing a number of phones, interconnected by an Ethernet/IP network.

FIG. 2 differs from FIG. 1 in that FIG. 2 shows two PBX cabinets 101 connected by an asynchronous communication network 103 (e.g., an Ethernet/IP network in a present embodiment), whereas FIG. 1 depicts the conventional copper path 102 for connecting two PBX cabinets. In applications where the phones to be serviced by the various PBX cabinets 101 are spread over a wide area (as in several buildings on an office campus) it may be more convenient or economic to use something other than copper path 102. Although the present embodiment uses Ethernet/IP network 103 to connect the PBX cabinets 101, those skilled in the art appreciate that other forms of asynchronous connection, such as asynchronous wireless connection, etc., might be employed.

A present embodiment is based on a model DS30 PBX marketed by Nortel Networks. The ensuing discussion relates specifics (timing, numbers of channels, etc.) unique to this device, but those skilled in the art appreciate that many of these specifics are design choices that may be departed from without departing from the scope and spirit of the invention. Those skilled in the art also appreciate that the present invention is not limited to use in a PBX switch but could be employed in many different circuit switches.

FIG. 3 depicts timing relationships pertaining to the occurrences of data within a PBX cabinet 101 and the packaging of data into Ethernet/IP packets for transmission over Ethernet/IP network 103 to another PBX cabinet 101. The ensuing discussion considers one PBX cabinet 101 to be a source and another to be a destination. Those skilled in the art realize that two-way communication is involved, and thus each PBX functions in both roles.

A PBX cabinet 101 in the present embodiment contains one or more digital line cards (DLC) (not shown) which can each service 16 phones. Each phone in the present embodiment can have two channels, a voice channel and a data channel. There are thus 32 channels serviced by a DLC.

Line A on FIG. 3 shows that there is a 1-KHz. clock pulse generated within PBX cabinet 101 which establishes a 1000-μsec. clock period. The 1000-μsec clock period is further divided into eight 125-μsec. frames delineated by an 8-KHz. clock and connoted 1–8 (line B). As indicated on lines C01–C32, 10 bits of data are established for each channel during each frame. As shown in element 410 in FIG. 4A, the 10 bits for each channel comprise an 8-bit PCM sample of the audio emanating from a microphone of the phone if a voice channel or 8 bits of data if a data channel, a signaling bit S, and a signaling validation bit V. In the present embodiment, a phone may send a control signal coded in an 8-bit code comprising the S bits of the eight ten-bit groups in one clock period. (Control signals are used to indicate such things as "the phone has been taken off hook", "the asterisk key is being depressed", etc.) While a control signal is active (as opposed to idle condition of the S bit) the V bit is on as well.

FIG. 3 shows that the data accumulated from the 32 channels during a 500-μsec. period is packaged into an Ethernet/IP packet, with alternate 500-μsec. periods coinciding with the start of a 1000-μsec. clock period. Channel data obtained during frames 1–4 of a clock period are packaged as shown in FIG. 4A, while channel data obtained during frames 5–8 of a clock period are packaged as shown in FIG. 4B.

Figure 4A:
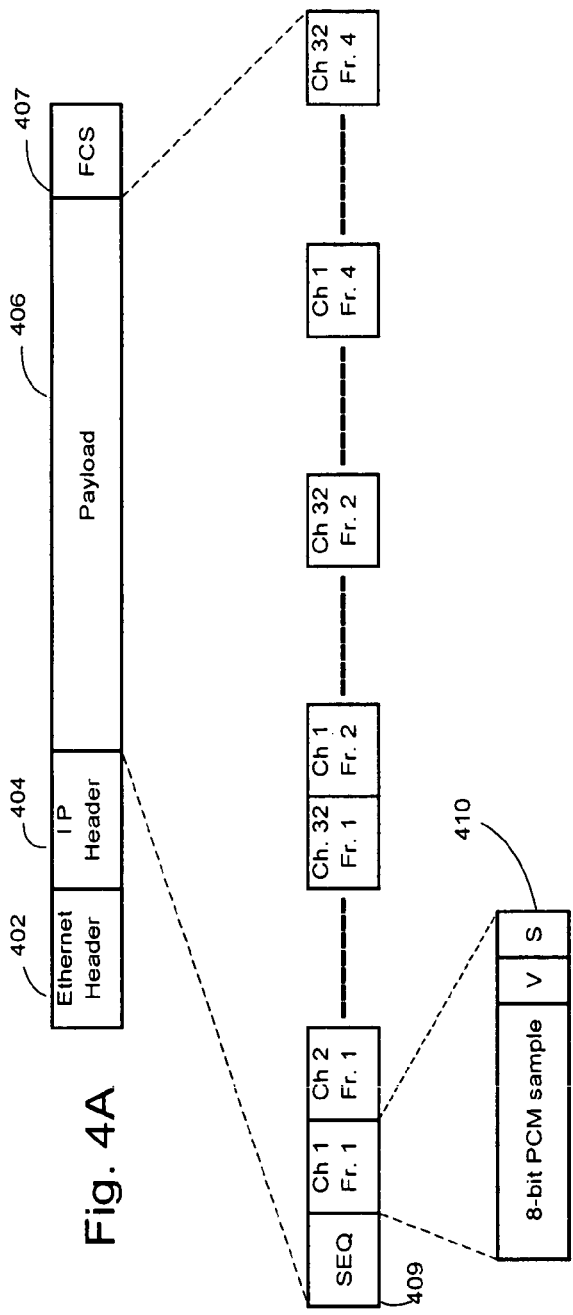
FIGS. 4A and 4B show the structure of Ethernet/IP packets carrying synchronous PBX data according to the present invention.
Figure 4B:
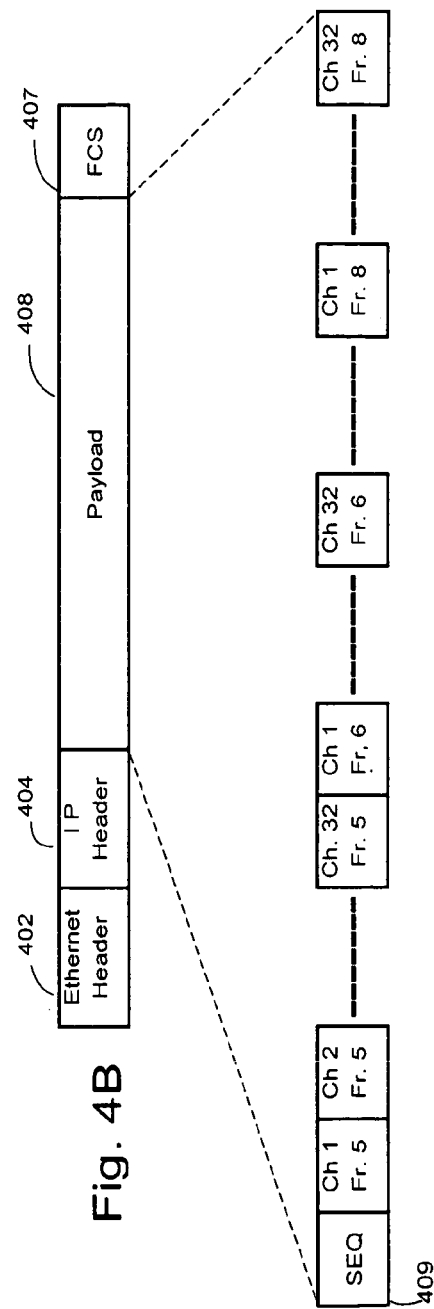

FIGS. 4A and 4B show that an Ethernet/IP packet comprises an Ethernet header 402, an Internet Protocol (IP) header 404, and a payload 406 or 408. The headers 402 and 404 are standard headers. The Frame Check Sequence (FCS) 407 is as specified in Ethernet Standards 802.3. The payloads 406 and 408 are identical in form but vary in content. Each payload begins with a sequence (SEQ) field which contains a sequence value for distinguishing a packet from its neighbors. In one embodiment the SEQ field is transmitted with alternating values chosen from two values, which distinguishes a packet from its immediate predecessor and its immediate successor. In other embodiments the SEQ field contains values chosen from a larger sequence of values which enables distinction from a larger number of neighboring packets. For example, the first two-hundred packets sent might have SEQ fields of 0 through 199 respectively, the second two-hundred packets sent might again have SEQ fields of 0 through 199 respectively, and so on.

Payload 406 then contains the ten-bit values 410 for each of the 32 channels for each of the frames 1–4, in the order: channel 1 through channel 32 for frame 1; channel 1 through channel 32 for frame 2; channel 1 through channel 32 for frame 3; and channel 1 through channel 32 for frame 4. Payload 408 is in corresponding order, but for frames 5, 6, 7, and 8.

Although a packet is transmitted every 500 μsec in the present embodiment, the duration of each packet is not necessarily equal to 500 μsec, and is probably less. Since various ones of the 32 channels depicted in FIG. 3 may become inactive at various times, the duration of the packets is variable. The packet transmission interval, however, is constant at 500 μsec in the present embodiment.

The Ethernet/IP packets as detailed in FIGS. 4A and 4B are then transmitted via Ethernet/IP network 103 to another PBX cabinet 101. Unlike conventional transmission over a copper path 102 (FIG. 1) or some alternative path which permits synchronous transmission, transmission via Ethernet/IP is inherently asynchronous. There is no provision for including any of the clock signals in the Ethernet/IP packets. Their inclusion, if attempted, would be meaningless since Ethernet transmission is inherently asynchronous and the arrival of clock signals at the destination is subject to indeterminate delay and variation. In order to play back the PCM and signaling data correctly at a destination PBX cabinet 101, suitable timing is reconstructed at the destination PBX cabinet 101.

Figure 5:
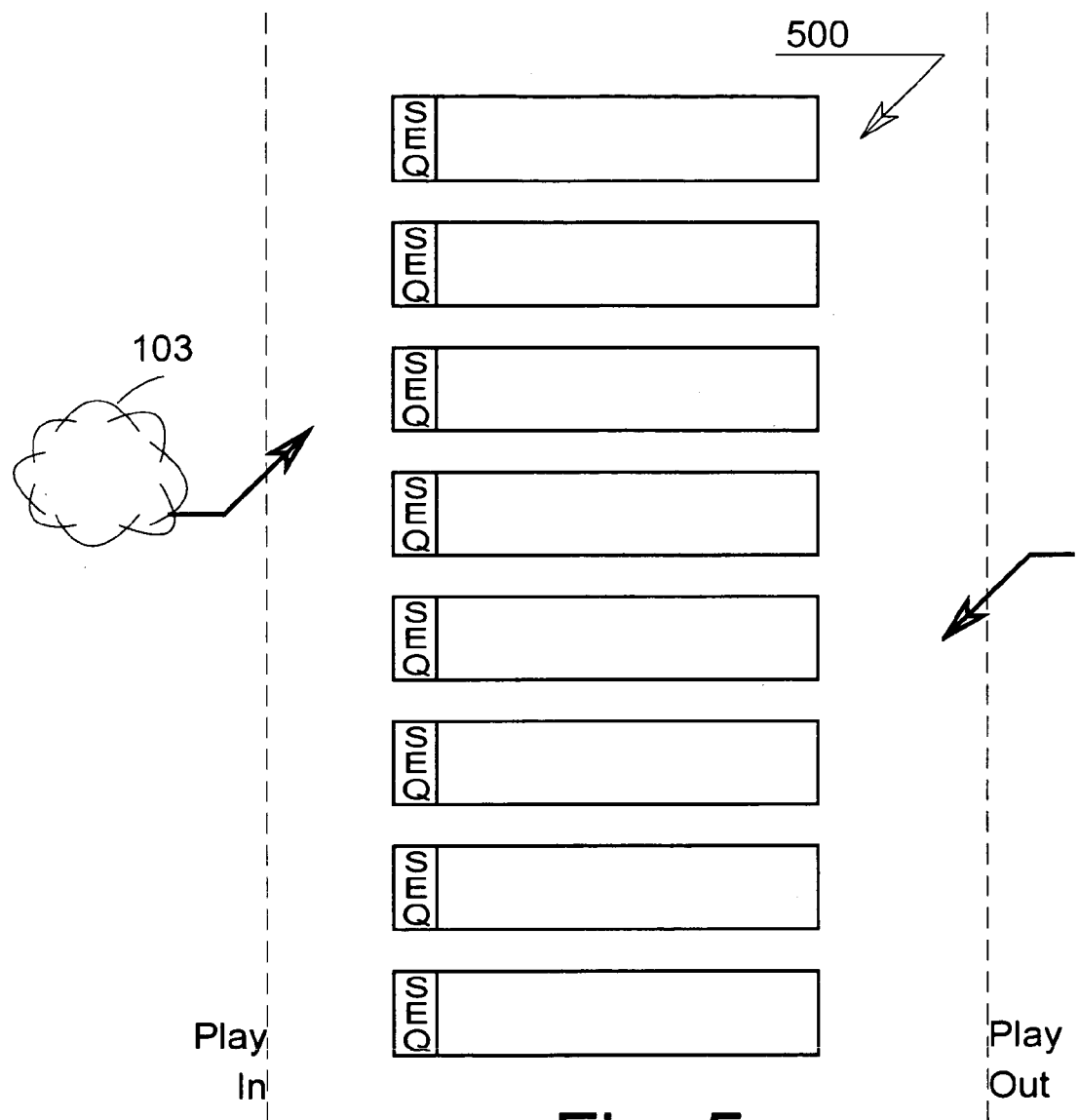
FIG. 5 illustrates the buffering of received Ethernet/IP packets according to the present invention.

FIG. 5 shows buffering provided at a destination PBX cabinet 101. Buffers 500 have sufficient capacity to buffer the payloads from eight packets, although those skilled in the art realize that the number eight is a design choice and might be varied without departing from the spirit of the invention. As packets arrive over asynchronous medium 103 the payloads are stored in buffers 500 sequentially, with wraparound; i.e., after the last of buffers 500 is used the next payload is stored into the first buffer. This is often referred to as a circular arrangement of buffers, or "a circular buffer". Those skilled in the art will recognize that other buffer arrangements may be employed. It is attempted to play data out of buffers 500 such that a buffer is played out before being overwritten by newly arriving data.

As indicated in FIG. 5 by the SEQ fields, arriving packets are be stored in buffers 500 in the order in which they were transmitted, said order being determined according to the SEQ fields. Thus, packets that are received out of order because of varying transmission delays are restored to correct order and the correct timing relationship among the packets may be determined. If the SEQ field contained in a buffer about to be played out indicates that the corresponding packet has not arrived, that packet is deemed to be lost in transmission, but the buffer is played out anyway with whatever content it happens to have. Thus, although message content is degraded with the loss in transmission of a packet, the relative timing of the payloads is unaffected. In an embodiment of the invention, should a packet that was deemed lost arrive after its corresponding buffer has been played out, it is simply discarded.

Figure 6:
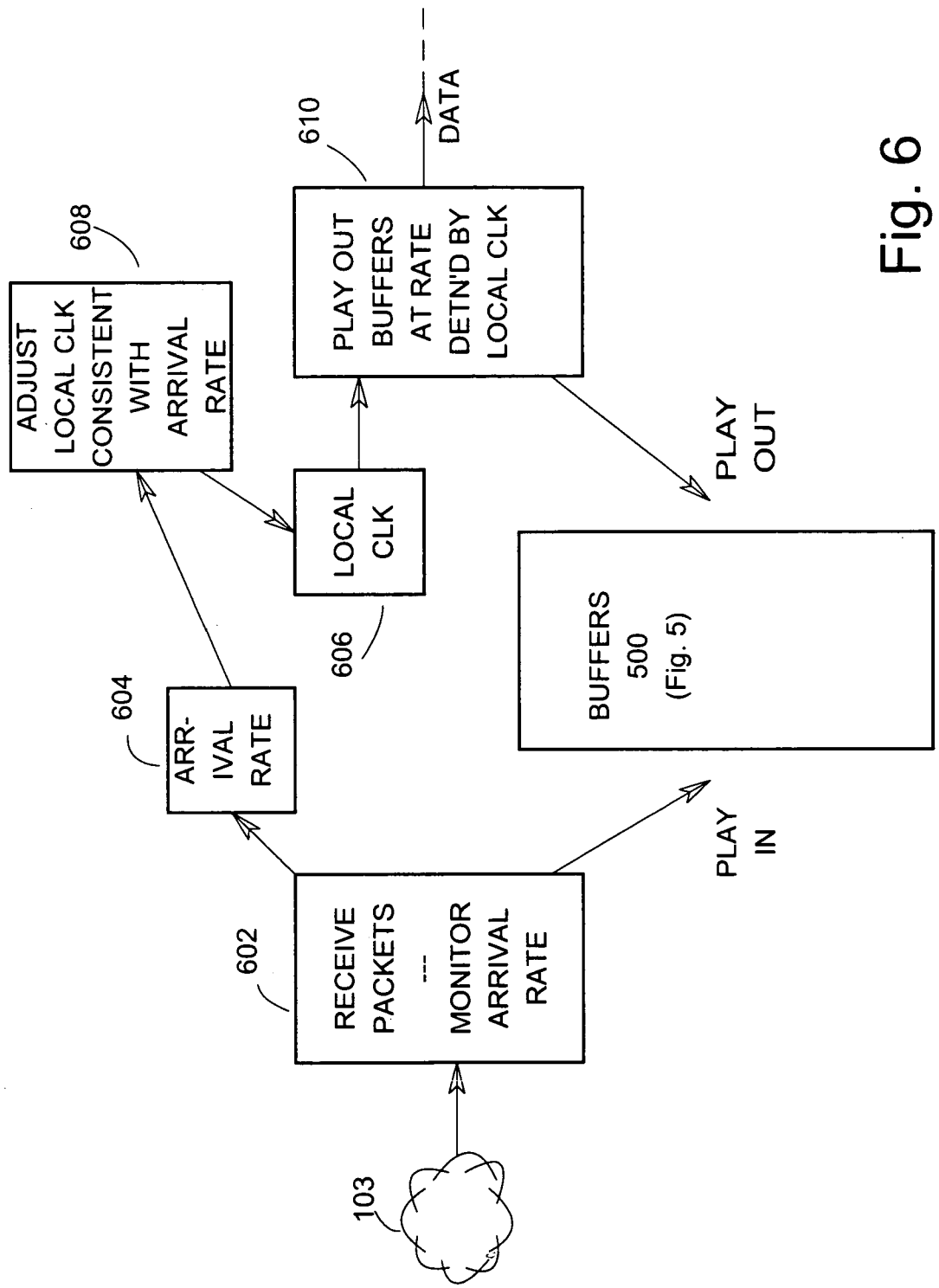
FIG. 6 is a block diagram of a system for reconstructing a synchronous clock after asynchronous transmission according to the present invention.

FIG. 6 is a block diagram of a system for manipulating the buffers 500 according to the present invention. Block 602 receives packets from asynchronous medium 103 and stores their payloads according to their SEQ fields in ones of buffers 500, using buffers 500 in a circular arrangement. Block 602 also maintains the arrival log 604. When operation of the system is initiated, the arrival rate is assumed to be equal to the transmission rate from the source PBX cabinet 101 (one packet every 500 $\mu$sec. in the present example). Thus local clock 606 is initialized according to the transmission rate from the source PBX cabinet 101. Block 610 plays out data from buffers 500, out of phase with the storing of buffers 500. That is, upon initialization of operation playing out does not begin until there is some backlog of data stored in the buffers 500.

Figure 8:
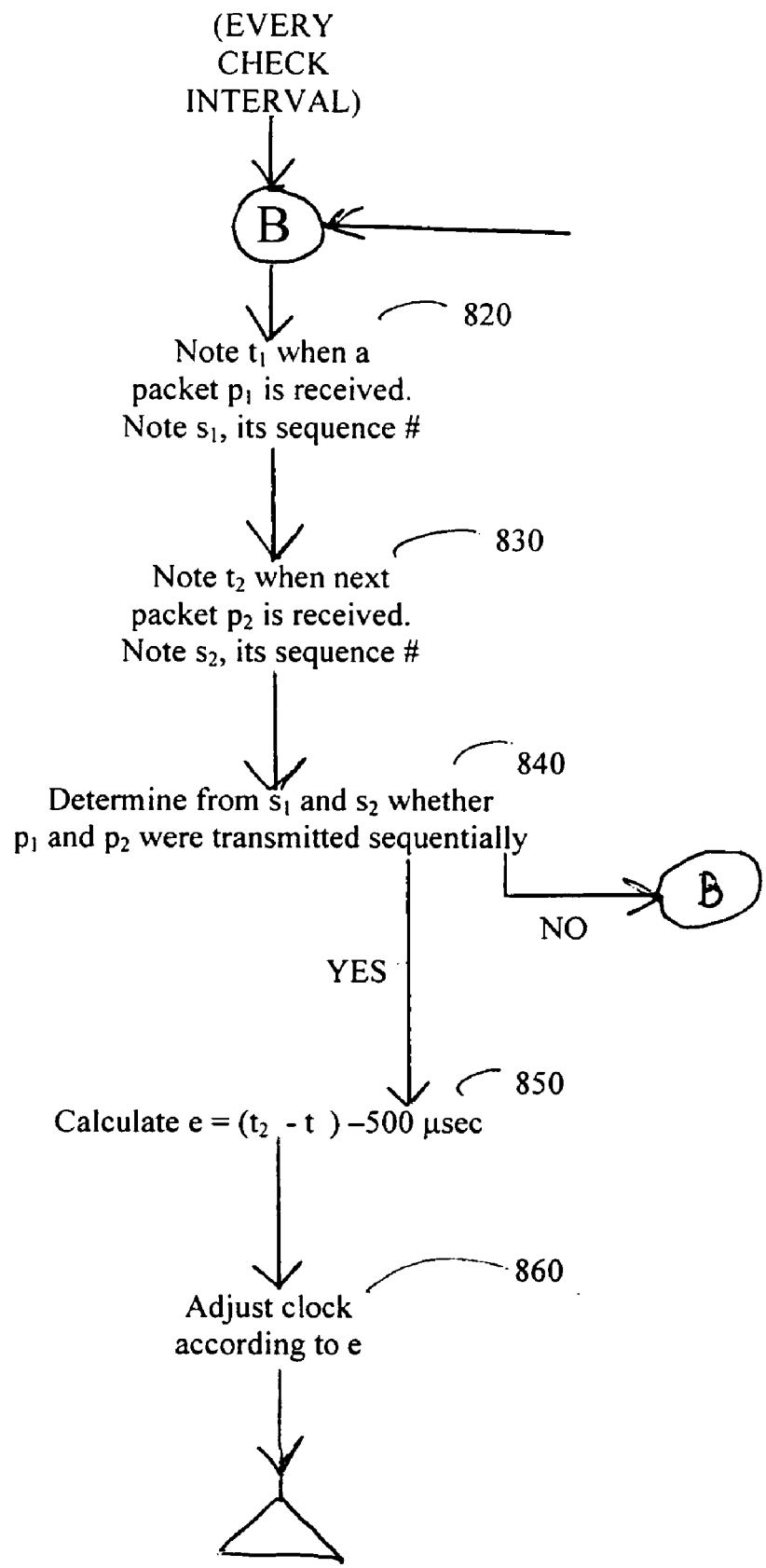
FIG. 8 is a flow chart of an alternative method for reconstructing a synchronous clock after asynchronous transmission according to the present invention.
Figure 9:
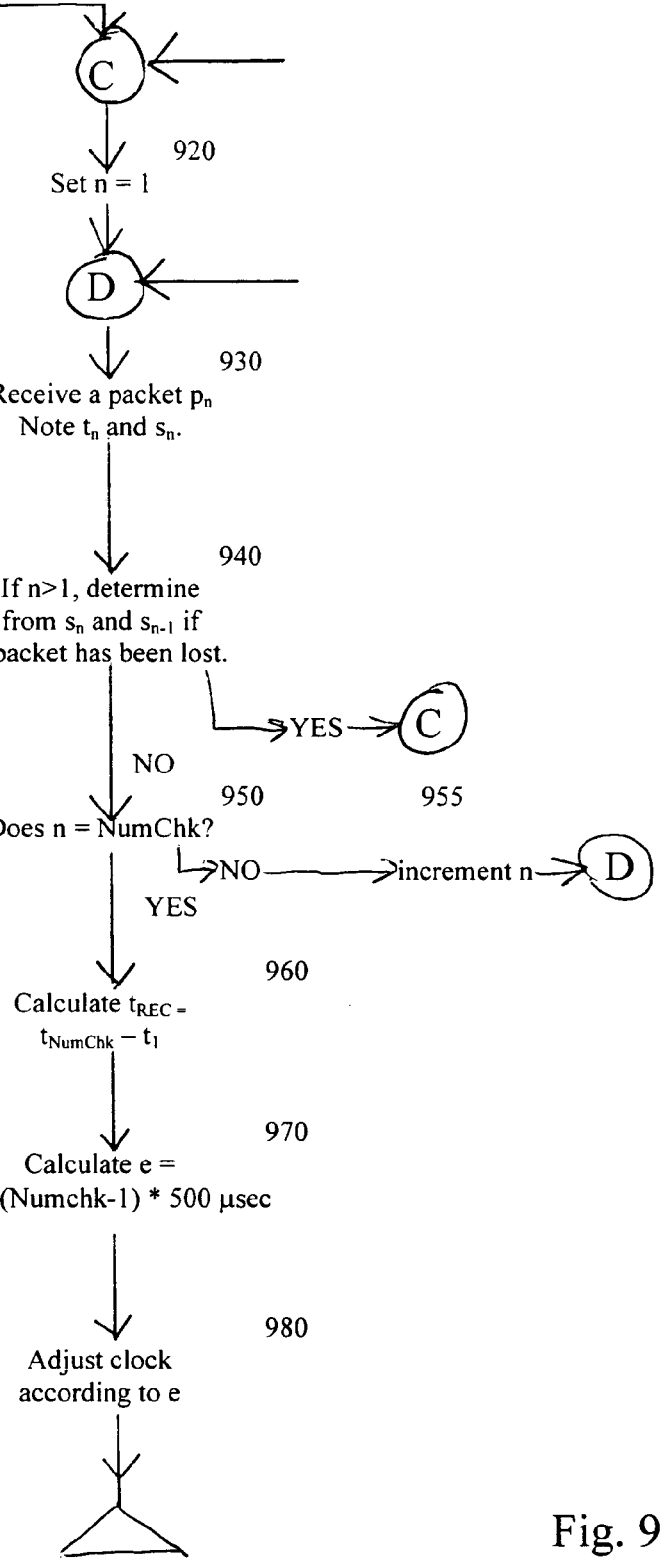
FIG. 9 is a flow chart of an alternative method for reconstructing a synchronous clock after asynchronous transmission according to the present invention.

Because of the asynchronous and possibly unreliable nature of communications medium 103, it is very unlikely that the actual arrival rate is precisely equal to the transmission rate from the source PBX cabinet 101, and thus it is unlikely that the initial value in clock 606 is exactly synchronous with the received data. Data loss is ameliorated by providing sufficient lag in buffers 500 to avoid loss of data during the time taken to correct the clock. FIGS. 7, 8, and 9 show alternative systems for correcting local clock 606 according to arrival log 604.

In the system of FIG. 7, clock correction may be effected once each "check interval", (ChkInt). ChkInt should be chosen to be a multiple of the transmission period from the source PBX 103. In a present embodiment wherein the transmission period is 500 $\mu$sec, ChkInt is chosen to be 50 msec. According to the system of FIG. 7, arrival log 604 is cleared at the beginning of a ChkInt, and then logs SEQ fields of packets received. In block 720, XmtCt is calculated, an estimate of the number of packets transmitted from source PBX 101 during ChkInt. XmtCt is constrained to being an estimate because of the asynchronous and unreliable nature of medium 103—packets enroute to a destination PBX 101 might be buffered or otherwise delayed somewhere along medium 103. The determination of XmtCt takes into account any wraparound in the SEQ fields. For example, if SEQ fields take values 0–199, and if the highest and lowest SEQ fields recorded in arrival log 604 are 32 and 133 respectively, then XmtCt would reflect an estimate of 100 packets transmitted. (The range of SEQ fields is larger than the number of packets that could be transmitted during ChkInt.) XmtCt may differ from the number of packets received during ChkInt, in that some packets may have been lost in transit but SEQ fields of packets transmitted after them would be indicative that those lost packets had been transmitted.

Block 730 calculates DELTA by subtracting the number of packets that should have been transmitted during ChkInt from XmtCt. Said number of packets that should have been transmitted is determined as ChkInt divided by the transmit interval—in the present example, 50 msec divided 500 $\mu$sec, or 100. Block 740 calculates an error indication e, and block 750 then adjusts local clock 606 accordingly. If XmtCt is higher than 100, clock 606 should be adjusted to play out packets more rapidly than the initially assumed 500 $\mu$sec interval; if lower than 100, packets should be played out more slowly. It is anticipated that in response to changing conditions on medium 103, both of these conditions will occur at different times in operation, and that at yet other times clock 606 will operate at the 500 $\mu$sec interval at which the source PBX 101 is transmitting. Inherent in the system of FIG. 7 is a tradeoff between the duration selected for ChkInt and the size of corrections that may be made to clock 606.

An alternative system for correcting clock 606 is depicted in FIG. 8. Again, a check interval connoted ChkInt is selected. Arrival log 604 is activated each ChkInt. Block 820 then notes the arrival time $t_1$ and the SEQ field value $s_1$ of the next packet received, connoted packet $P_1$. Block 830 then notes the arrival time $t_2$ and the SEQ field value $s_2$ of yet the next packet received, connoted packet $P_2$.

Block 840 checks that $s_1$ and $s_2$ are consecutive numbers (again, with accounting for possible wraparound) in order to determine whether packets $p_1$ and $p_2$ were transmitted sequentially. If not (indicating that one or more intervening packets may have been lost) control dispatches back to block 820 to make another try at receiving two sequentially transmitted packets; if so, control passes on to block 850.

Block 850 assess the current rate of change in delay on medium 103 as $(t_2-t_1)-500$ $\mu$sec (500 $\mu$sec being the interpacket interval of the packets as transmitted). Block 860 adjusts clock 606 according to the results of the value calculated in block 850. If the delay is currently constant, the time between arrivals of the two packets is equal to the 500 $\mu$sec period imposed by the source PBX 101, and the value calculated in block 850 is zero. If the delay is decreasing, packets appear to be arriving slightly more often than every 500 $\mu$sec, and clock 606 should be speeded up accordingly. Conversely, if delay is increasing, packets appear to be arriving slightly less often than every 500 $\mu$sec and clock 606 should be slowed accordingly.

Under the system of FIG. 8, ChkInt may be selected as a much shorter interval than under the system of FIG. 7 without that system's effect of coarsening the granularity of correction. Thus, the rate of change in delay may be assessed often.

FIG. 9 depicts another alternative system for correcting ck 606. Here the rate of change of delay on medium 103 will be assessed over several packet times, specified as a number NumChk packet times. Block 920 sets a variable n to a value of 1. In block 930, the next packet is received and arrival log 604 stores its arrival time $t_n$ and SEQ field value $s_n$.

In block 940, if at least two packets have been received a determination is made from the SEQ fields of the two most recently received packets whether an intervening packet has been lost. If a packet has been lost control returns to block 920 to initiate a new attempt to receive NumChk consecutive packets without a lost packet. If no packet has been lost control passes to block 950.

Block 950 determines whether NumChk packets have been received. If not, block 955 increments n and control passes to block 930 to continue accumulating packet data; if so, control passes to block 960.

Block 960 calculates the time between receipt of the first and last of the NumChk packets as $t_{rec}=t_{NumChk}-t_1$. Block 970 then calculates e, the difference between $t_{rec}$, and the time that would have elapsed had delay on medium 103 been constant as $e=t_{rec}-(NumChk-1)*500$ $\mu$sec. Block 980 then adjusts clock 606 according to the value of e.

Figure 10:
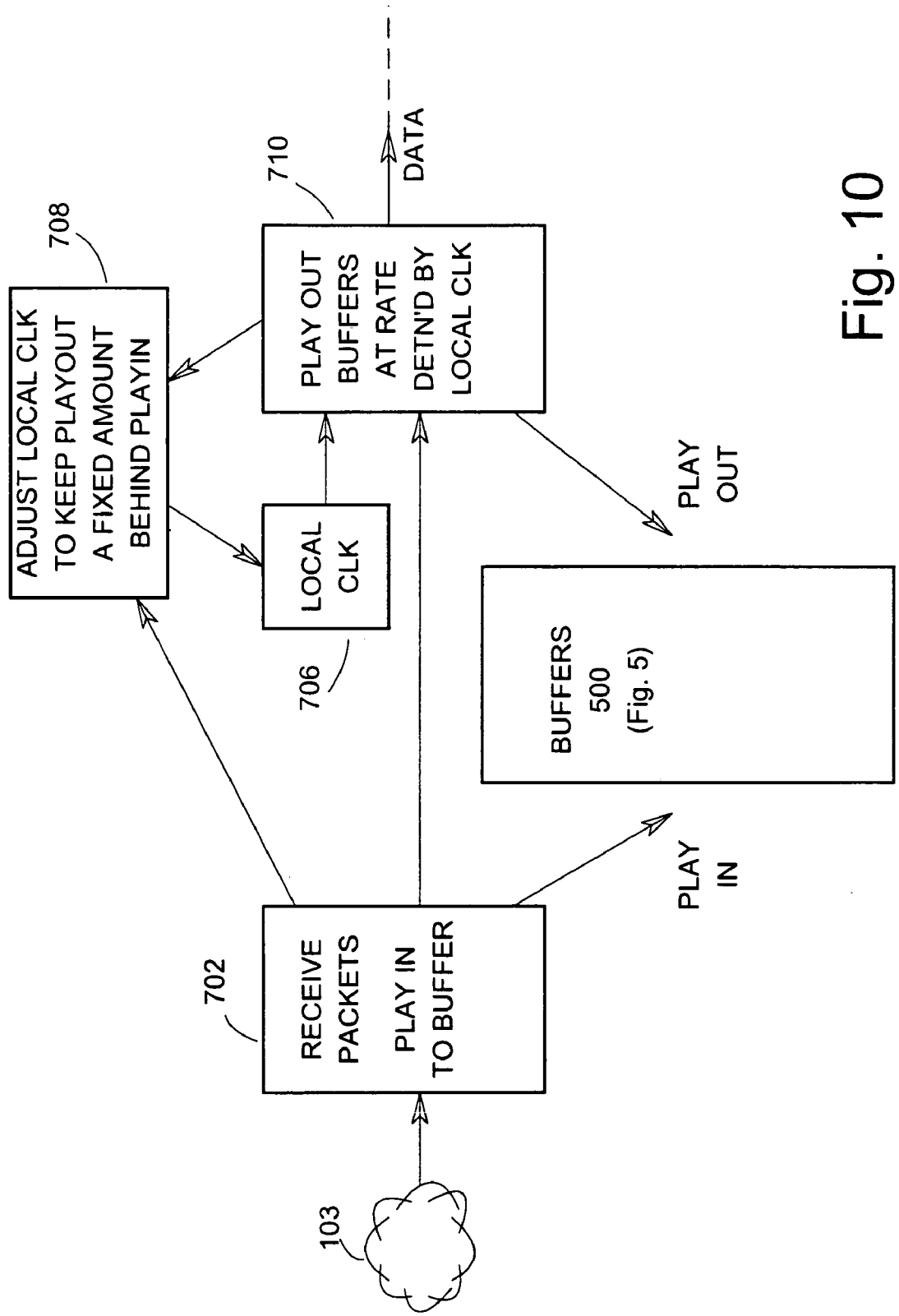
FIG. 10 is a block diagram of a system for reconstructing a synchronous clock after asynchronous transmission according to the present invention.

An alternative scheme for reconstructing a local clock in a destination PBX cabinet 1101 is depicted in FIG. 10. Block 702 receives packets from communications medium 103 and plays payload data into buffers 500. Block 702 also has a path for informing block 710 of the position within buffers 500 where it is presently storing data. Block 710 plays data out of buffers 500 at a rate determined by local clock 706 and from a position some predetermined increment behind the point at which block 702 is playing in data. That is, when operation is initialized, local clock 706 is initialized to the expected transmission rate, and play-out is not commenced until the aforementioned predetermined increment of data has been played in to the buffers 500. (For example, with buffering for the payloads from eight packets, the predetermined increment is one-half the buffer capacity, or four payloads.)

Block 710 reports to block 708 the positions of play-in and play-out. If play-out is ahead by less than the predetermined increment, block 708 adjusts local clock 706 so as to speed it up. Conversely, if play-out is ahead of play-in by more than the predetermined increment, block 708 adjusts local clock 706 so as to slow it down. Local clock 706 may be used for conventional timing functions relative to processing incoming data (e.g., delivering audio to the earpiece of a phone), as was the case with local clock 606 of FIG. 6.

The functions depicted in FIGS. 6 through 10 may be performed in an arithmetic and logic unit (ALU), which may be generically described as a digital device responsive to preprogrammed instructions. In a present embodiment, the reception of packets from communications medium 103 and the play-in and play-out of buffers 500 are handled by a programmable gate array (PGA) responsive to instructions coded in the C programming language, and the other functions described are performed in a microprocessor already extant in a PBX cabinet. Those skilled in the art appreciate that a wide variety of microprocessors, PGA's, application-specific integrated circuits (ASIC's), and reduced instruction-set controllers (RISC's), etc. may be employed for the purpose.

It will thus be seen that the invention attains the advantages set forth above, among those made apparent from the preceding description. In particular, the invention provides reconstruction of a local clock for synchronous data after asynchronous transmission. Those skilled in the art will appreciate that the buffering depicted in FIG. 5 in conjunction with the play-out and clock adjustment systems depicted in FIGS. 6 through 10 allows the transmission speed of data over an asynchronous medium to vary, and allows reconstruction of a clock at the receiving end. The clock thus reconstructed varies in speed so as to re-establish synchrony with the data.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Apparatus for synchronizing a clock with data received via an asynchronous transmission medium, comprising:
   a plurality of buffers connected to said asynchronous transmission medium;
   circuitry configured for reading out data from said buffers at a clock rate specified by said clock;
   a regulating circuit configured to regulate said clock rate according to transmission rate of said data;
   wherein said data received from said transmission medium is organized into packets;
   associated with each packet is a sequence field identifying transmission order of packets;
   said plurality of buffers comprises circularly arranged buffers, each allocated to a sequential one of said packets according to said sequence field, whereby packets are stored in order of transmission regardless of order of reception;
   associated with said buffers is a discrimination circuit configured to determine according to said sequence field whether a packet has been received by such time as its corresponding buffer is to be read out; and
   a packet received after readout of its corresponding buffer commences is discarded,
   whereby loss of a packet in transmission does not affect timing relationships among other packets.

2. The apparatus according to claim 1 wherein:
   said regulating circuit regulates said clock rate so that said data is read out from said buffers at a rate substantially equal to a rate at which said data is transmitted via said asynchronous transmission medium.

3. The apparatus according to claim 2 wherein:
   said data is input to said transmission medium at a predetermined constant rate; and
   said clock rate is initially set to said predetermined constant rate.

4. The apparatus according to claim 1 wherein:
   said data is input to said transmission medium at a predetermined constant rate;
   said clock rate is initially set to said predetermined constant rate;
   said readout circuit commences reading said data out of said buffers when said buffers are filled to a predetermined portion of their capacity; and
   said regulating circuit regulates said clock rate so that said readout circuit is reading out data from said buffers at a first position that is behind a second position at which said data is being received by said buffers from said transmission medium by an amount substantially equal to said predetermined portion.

5. The apparatus according to claim 1 wherein said data was synchronous data prior to transmission via said asynchronous transmission medium, and wherein said regulating circuit regulates said clock according to a ratio of a number of packets received during a predetermined period and a number of packets synchronously transmitted during said predetermined period.

6. The apparatus according to claim 1 wherein said data was synchronous data prior to transmission via said asynchronous transmission medium, and wherein said regulating circuit regulates said clock according to a ratio of a time between two successively received packets and a time between synchronous transmission of two successive packets.

7. The apparatus according to claim 1 wherein said data was synchronous data prior to transmission via said asynchronous, and wherein said regulating circuit regulates said clock according to a rate of change of transmission delay occurring in said transmission medium.

8. Means for synchronizing a clock using data received via an asynchronous transmission medium, comprising:

a plurality of buffers connected to said asynchronous transmission medium;

readout means for reading out said data from said buffers at a rate specified by said clock;

regulating means for regulating said clock rate according to a rate of transmission of said data;

wherein said data received from said transmission medium is organized into packets;

associated with each packet is a sequence field identifying transmission order of packets;

said buffers comprise a circularly arranged plurality of storage blocks, each allocated to a sequential one of said packets according to said sequence field, whereby packets are stored in order of transmission regardless of order of reception;

associated with said buffers is a discrimination means for determining according to said sequence field whether a packet has been received by such time as its corresponding buffer is to be read out; and a packet received after readout of its corresponding buffer commences is discarded;

whereby loss of a packet in transmission does not affect timing relationships among other packets.

9. The means according to claim 8 wherein:

said regulating means regulates said clock rate so that said data is read out from said buffers at a rate substantially equal to a rate at which said data is currently being transmitted via said asynchronous transmission medium.

10. The means according to claim 9 wherein:

said data is input to said transmission medium at a predetermined constant rate; and said clock rate is initially set to said predetermined constant rate.

11. The means according to claim 8 wherein:

said data is input to said transmission medium at a predetermined constant rate;

said clock rate is initially set to said predetermined constant rate;

said readout means commences reading said data out of said buffers when said buffers are filled to a predetermined portion of their capacity; and said regulating means regulates said clock rate so that said readout means is reading out data from said buffers at a first position that is behind a second position at which said data is being received by said buffers from said transmission medium by an amount substantially equal to said predetermined portion.

12. The means according to claim 8 wherein said data is organized said data was synchronous data prior to transmission via said asynchronous transmission medium, and wherein said regulating means regulates said clock according to a ratio of a number of packets received during a predetermined period and a number of packets synchronously transmitted during said predetermined period.

13. The means according to claim 8 wherein said data was synchronous data prior to transmission via said asynchronous transmission medium, and wherein said regulating means regulates said clock according to a ratio of a time between two successively received packets and a time between synchronous transmission of two successive packets.

14. The means according to claim 8 wherein said data was synchronous data prior to transmission via said asynchronous, and wherein said regulating means regulates said clock according to a rate of change of transmission delay occurring in said transmission medium.

15. A method of synchronizing a clock, comprising:

receiving data from an asynchronous transmission medium;

buffering blocks of data received from said transmission medium;

reading out buffered data at a rate specified by said clock;

regulating said clock rate according to a transmission rate of said data;

wherein said data received from said transmission medium is organized into packets;

associated with each packet is a sequence field identifying transmission order of packets;

said buffering employs a circularly arranged plurality of buffers, each allocated to a sequential one of said packets according to said sequence field, whereby packets are stored in order of transmission regardless of order of reception;

and the method further includes the steps of:

determining according to said sequence field whether a packet has been received by such time as its corresponding buffer is to be read out; and discarding a packet received after readout of its corresponding buffer commences;

whereby loss of a packet in transmission does not affect timing relationships among other packets.

16. The method according to claim 15 wherein:

said regulating step regulates said clock rate so that said buffered data is read out at a rate substantially equal to a rate at which said data is currently being transmitted via said asynchronous transmission medium.

17. The method according to claim 16 wherein said data is input to said transmission medium at a predetermined constant rate, and the method includes the step of:

initially setting said clock rate to said predetermined constant rate.

18. The method according to claim 15 wherein:

said data is input to said transmission medium at a predetermined constant rate;

said clock rate is initially set to said predetermined constant rate;

said step of reading out data commences reading said data out of said buffers when said buffers are filled to a predetermined portion of their capacity; and said regulating step regulates said clock rate so that said readout circuit is reading out data from said buffers at a first position that is behind a second position at which said data is being received by said buffers from said transmission medium by an amount substantially equal to said predetermined portion.

19. The method according to claim 15 wherein said data was synchronous data prior to transmission via said asynchronous transmission medium, and wherein said regulating step comprises regulating said clock according to a ratio of a number of packets received during a predetermined period and a number of packets synchronously transmitted during said predetermined period.

20. The method according to claim 15 wherein said data was synchronous data prior to transmission via said asynchronous transmission medium, and wherein said regulating step comprises regulating said clock according to a ratio of a time between two successively received packets and a time between synchronous transmission of two successive packets.

21. The method according to claim 15 wherein said data was synchronous data prior to transmission via said asynchronous, and wherein said regulating step comprises regulating said clock according to a rate of change of transmission delay occurring in said transmission medium.

22. A PBX distributed in at least two cabinets interconnected by an asynchronous transmission medium comprising:

a clock in at least one of said cabinets;

a plurality of buffers in said at least one of said cabinets configured to buffer data received over said asynchronous transmission medium;

wherein said clock is configured to clock said buffers;

wherein a clock rate of said clock is controlled by a rate of transmission of said data;

wherein said data received from said transmission medium is organized into packets;

associated with each packet is a sequence field identifying transmission order of packets;

said buffers comprise a circularly arranged plurality of storage blocks, each allocated to a sequential one of said packets according to said sequence field, whereby packets are stored in order of transmission regardless of order of reception;

associated with said buffers is a discrimination means for determining according to said sequence field whether a packet has been received by such time as its corresponding buffer is to be read out; and a packet received after readout of its corresponding buffer commences is discarded, whereby loss of a packet in transmission does not affect timing relationships among other packets.

23. The PBX according to claim 22 wherein:

said clock rate is controlled so that said data is read out from said buffer means at a rate substantially equal to a rate at which said data is currently being transmitted via said asynchronous transmission medium.

24. The PBX according to claim 23 wherein:

said data is input to said transmission medium at a predetermined constant rate; and said clock rate is initially set to said predetermined constant rate.

25. The PBX according to claim 22 wherein:

said data is input to said transmission medium at a predetermined constant rate;

said clock rate is initially set to said predetermined constant rate;

said reading data out of said buffers commences means when said buffers are filled to a predetermined portion of their capacity; and said clock rate is controlled so that said reading out data from said buffers is at a first position that is behind a second position at which said data is being received by said buffers from said transmission medium by an amount substantially equal to said predetermined portion.

26. The PBX according to claim 22 wherein said data was synchronous data prior to transmission via said asynchronous transmission medium, and wherein said clock rate is controlled according to a ratio of a number of packets received during a predetermined period and a number of packets synchronously transmitted during said predetermined period.

27. The PBX according to claim 22 wherein said data was synchronous data prior to transmission via said asynchronous transmission medium, and wherein said clock rate is controlled according to a ratio of a time between two successively received packets and a time between synchronous transmission of two successive packets.

28. The PBX according to claim 22 wherein said data was synchronous data prior to transmission via said asynchronous, and wherein said clock rate is controlled according to a rate of change of transmission delay occurring in said transmission medium.

29. Computer programs embodied in a tangible medium for synchronizing a clock with a transmission rate of data received via an asynchronous transmission medium, comprising instructions directing an arithmetic and logic unit (ALU) to:

store blocks of data received from said transmission medium in a plurality of buffers;

read out said data from said buffers at a rate specified by said clock;

regulate said clock rate according to a rate of transmission of said data;

wherein said data received from said transmission medium is organized into packets;

associated with each packet is a sequence field identifying transmission order of packets;

said plurality of buffers comprises a circularly arranged plurality of buffers, each allocated to a sequential one of said packets according to said sequence field, whereby packets are stored in order of transmission regardless of order of reception; and the computer programs further direct said ALU to:

determine according to said sequence field whether a packet has been received by such time as its corresponding buffer is to be read out; and discard a packet received after readout of its corresponding buffer commences;

whereby loss of a packet in transmission does not affect timing relationships among other packets.

30. The computer programs according to claim 29 wherein:

said instructions direct the performance of said regulating of said clock such that said data is read out from said buffers at a rate substantially equal to a rate at which said data is currently being transmitted via said asynchronous transmission medium.

31. The computer programs according to claim 30 wherein said data is input to said transmission medium at a predetermined constant rate, and wherein said instructions direct the ALU to initially set said clock rate to said predetermined constant rate.

32. The computer programs according to claim 29 wherein:
- said data is input to said transmission medium at a predetermined constant rate;
- said computer programs instruct said ALU to initially set said clock rate to said predetermined constant rate;
- said instructions direct that said reading out of data from said buffers commences when said buffers are filled to a predetermined portion of their capacity; and
- said instructions direct said regulating said clock rate such that said readout circuit is reading out data from said buffers at a first position that is behind a second position at which said data is being received by said buffers from said transmission medium by an amount substantially equal to said predetermined portion.

33. The computer programs according to claim 29 wherein said data was synchronous data prior to transmission via said asynchronous transmission medium,
- and wherein said instructions regulate said clock according to a ratio of a number of packets received during a predetermined period and a number of packets synchronously transmitted during said predetermined period.

34. The computer programs according to claim 29 wherein said data was synchronous data prior to transmission via said asynchronous transmission medium,
- and wherein said instructions regulate said clock according to a ratio of a time between two successively received packets and a time between synchronous transmission of two successive packets.

35. The computer programs according to claim 29 wherein said data was synchronous data prior to transmission via said asynchronous, and wherein said instructions regulate said clock according to a rate of change of transmission delay occurring in said transmission medium.

* * * * *